April 9, 1935.        A. D. EITZEN        1,996,758
QUOTATION PROJECTING APPARATUS
Original Filed March 22, 1930    3 Sheets-Sheet 1

INVENTOR
August D. Eitzen,
BY Gustav Drews
ATTORNEY

April 9, 1935.                    A. D. EITZEN                    1,996,758
                          QUOTATION PROJECTING APPARATUS
                  Original Filed March 22, 1930    3 Sheets-Sheet 2

INVENTOR
August D. Eitzen,
BY
Gustav Drews
ATTORNEY

April 9, 1935.  A. D. EITZEN  1,996,758
QUOTATION PROJECTING APPARATUS
Original Filed March 22, 1930  3 Sheets-Sheet 3
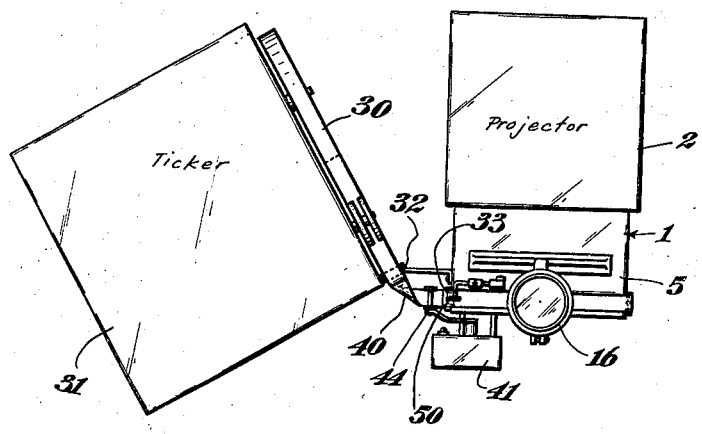
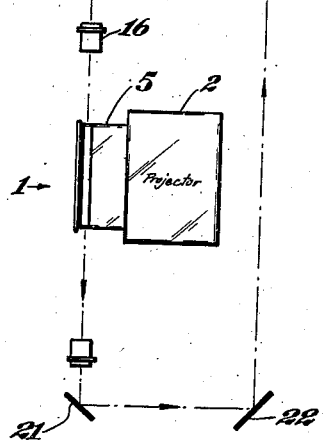
INVENTOR
August D. Eitzen,
BY
Gustav Drews
ATTORNEY Patented Apr. 9, 1935

1,996,758

UNITED STATES PATENT OFFICE 1,996,758

QUOTATION PROJECTING APPARATUS

August D. Eitzen, Rockville Centre, N. Y., assignor to News Projection Corporation, New York, N. Y., a corporation of New York Application March 22, 1930, Serial No. 437,962
Renewed May 4, 1934

9 Claims. (Cl. 88—24)

My invention relates to apparatus for projecting the printed image of a tape such as a stock ticker tape upon a screen and especially to improved apparatus for projecting two images from the same tape upon different screens and preferably from a single light source.

The principal feature of the invention, as briefly described, consists in two opposite light apertures, with a condensing lens for each, mirrors and usually also other condensing lenses for properly directing and dividing a light beam from a single source to pass through the respective apertures and the condensers located adjacent the apertures, means for guiding the tape from the ticker in a generally circuitous course about the support or enclosure for the light apertures and their condensers and over the apertures, objective lenses, and mirrors properly arranged to direct the light beams from the respective apertures to screens located in desired positions.

Desirably, in some cases the tape is reversed, or twisted laterally through a half-turn between the ticker and the projector so that it passes over the light apertures with the printed face inward thus reducing to a minimum the number of mirrors which are necessary to direct the light beams to the respective screens and present the tape characters in proper positions thereon, although this is not essential and if desired the tape may run directly to the projector and pass over the apertures with printed side outward, with a different mirror arrangement, as fully explained hereafter.

In a preferred arrangement the light apertures are in vertically opposite positions and the tape passes about the projector in a course which is in a vertical plane.

These and other features, capabilities and advantages of the invention will appear from the subjoined detail description of one embodiment thereof, illustrated in the accompanying drawings, in which Fig. 1 is a front elevation of apparatus embodying the invention in one form, with some parts in section;

Fig. 3 is a plan view of the ticker and projector, omitting the screens and mirrors; and Fig. 4 is an elevation of a modified arrangement.

Fig. 5 is a detail view of a tape guide.

The showing of the drawings is largely diagrammatic.

Figure 1:
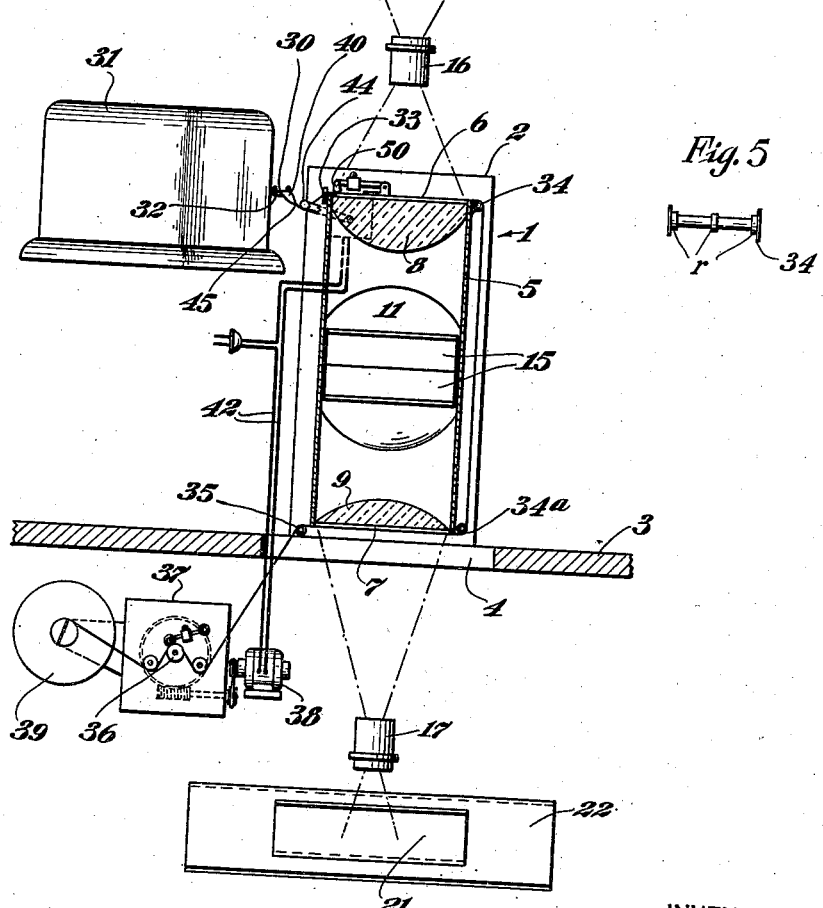
Figure 2:
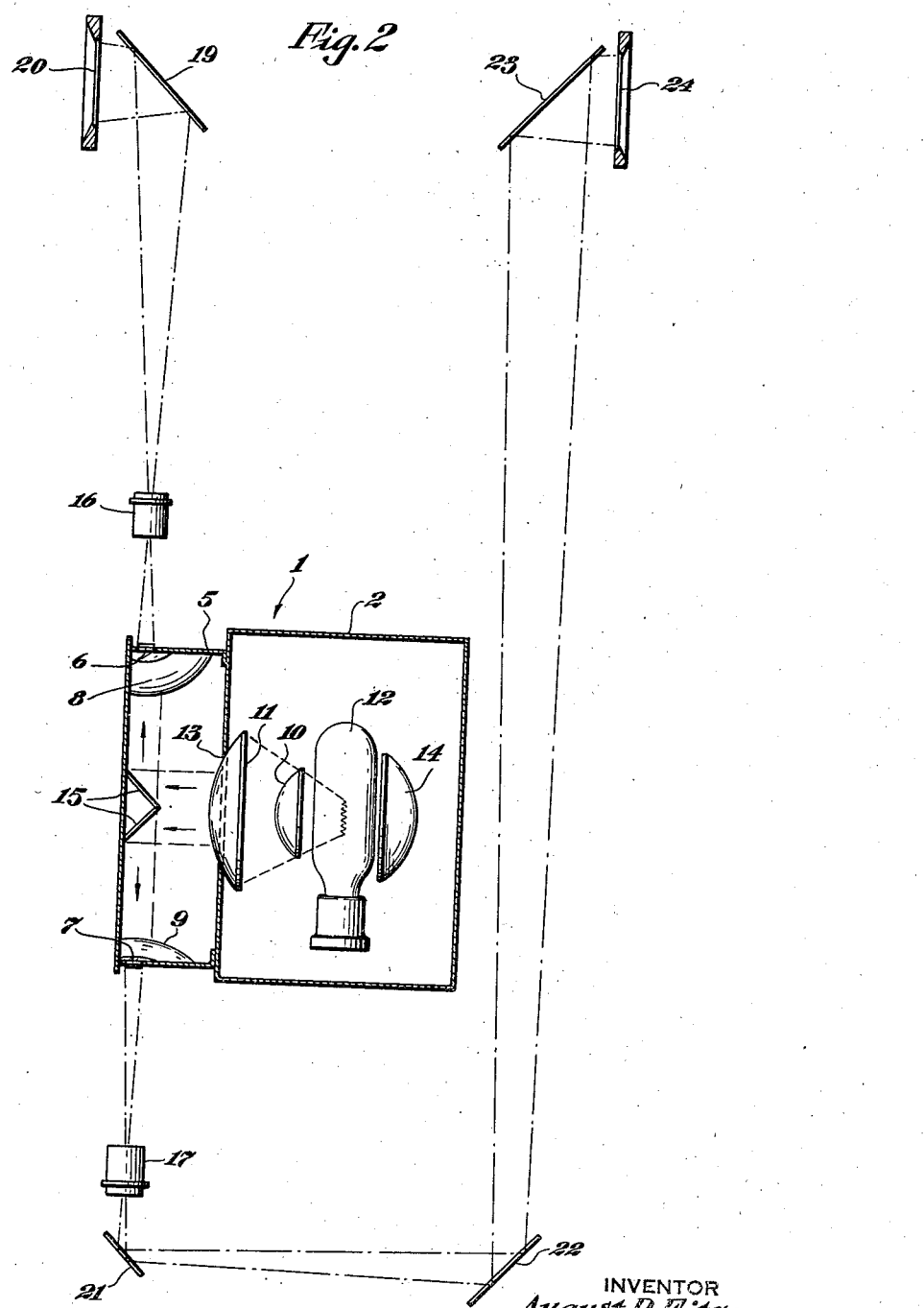
Fig. 2 is a vertical section from the right of Fig. 1.

In Figs. 1 to 3 the projector 1 includes the lamp housing 2, here shown in simple form, which may rest on a support such as a floor 3, Fig. 1, or other support in a convenient position with relation to the definitely located screens. If the support such as 3, is in the nature of a floor it has an aperture 4 for one of the light beams.

The lamp housing has another compartment or extension 5 forming a housing for certain lenses and also arranged for movement of the tape about it, or about three of its sides. At opposite sides of the lens housing 5 and preferably in upper and lower sides are light apertures 6 and 7 respectively of a length corresponding to a desired length of tape. A condensing lens 8 is supported within the upper wall of the housing in centered relation to the upper aperture and another condensing lens 9 is secured within the lower wall in centered relation to the lower aperture.

Suitable condensing lenses such as 10 and 11 are arranged with their common axis at a right angle to the common axis of the condensers 8 and 9, the condenser 11 being located at a light aperture 13 in the lamp housing. The arrangement may be such as shown, to eliminate all but a desired part of the total light beam from the lamp through the first condensers 10 and 11. A reflector 14 is located behind the lamp.

Mirrors 15 are supported on the front or vertical wall of the condenser housing 5, these being arranged at a right angle to each other, and at an angle of 45° to the respective beam axes. Each mirror intercepts one-half the light beam from condenser 11 and directs this light to the corresponding condensers 8 or 9.

Suitable objective lenses are mounted in a casing 16 above the upper light aperture 6 and another objective 17 is supported below the lower aperture 7. The beam through objective 16 is directed by a single mirror 19 at a 45° angle to a screen 20 and the beam through objective 17 is first directed horizontally by a mirror 21 arranged at a 45° angle, to another mirror 22 arranged at a similar angle and from mirror 22 is thrown upward to another 45° angle mirror 23 which directs the light beam to the second screen 24. The screen positions may, of course, be different with relation to the projector, the screen and mirror arrangements illustrated being a sufficient example of such arrangements suitable to a multiple projector in which the two beams are preferably initially thrown oppositely upward and downward.

The tape 30 issuing from the tape printer or ticker 31, over a guide 32 passes over guide 33 at the top of the lens and mirror housing 5, at the side adjacent the ticker, and from guide 33 is directed over the top of the housing and over the upper light aperture 6 to a guide, which may be a roll 34, at the side of the housing away from the ticker; the tape then passes down at the right of the housing 5, as viewed in Fig. 1, to another guide roll 34a, is then directed across and below the lower light aperture 7 to a guide roll 35 and thence to the feed rolls 36 of the tape puller 37 driven by a motor 38 and also arranged to operate a rewind reel 39 in the usual way. In one preferred arrangement, as above referred to, the tape is so supported or guided that it has between the ticker and the projector a transverse one-half turn or twist as at 40. As the tape issues from the ticker the printed surface is upward and the half-turn or twist brings the printed surface downward or inward in relation to the light aperture and the tape passes about the projector housing and over the apertures in this position. In such a case the guides, such as 33, 34, 34a and 35 may be provided with raised, straight or annular ribs r (Fig. 5) to engage unprinted longitudinal strips of the tape surface between or at the sides of the lines of printing thereon, thus avoiding any contact of the printed surface with guide surfaces and consequent blurring of the print. Such guides are disclosed in my copending applications, and are not here illustrated in detail.

To facilitate the shortest and most direct travel of the tape from the ticker to the projector, with the half-twist or turn in the tape as above referred to, the ticker is preferably placed at a diagonal or oblique angle to the projector, as shown in Figs. 1 and 3.

The tape puller or its motor is controlled by a suitable switch in a switch box 41 supported on the projector, as best shown in Fig. 3, and inserted in the puller driving or controlling circuit 42, Fig. 1, and the switch is controlled by a follower, such as a finger 44 running on a tape loop 45 between the ticker and the projector, this loop portion of the tape being specifically as shown, between the transverse twist 40 and the first projector guide 33. The follower and switch control the action of the tape puller in accordance with ticker operation, in a manner well understood in the art. While, as shown, the switch directly controls the power circuit 42 of the motor, it may otherwise be inserted in another controlling circuit, as for example, when the motor runs continuously and the puller is controlled by a brake or clutch and in such case the controlling switch may be placed in the brake or clutch circuit. Desirably, a tape retarder such as the friction member 50 acts on the tape at a point before it reaches the first (upper) light aperture 6, this device acting in a known manner to apply moderate frictional retarding force to the tape to steady its movement about the projector housing and over the two light apertures, and reduce jerking on the tape anterior to the projector and for other reasons as understood by skilled persons.

By the described tape and mirror arrangement, the image of the tape strip located at each light aperture is thrown upon the respective screen 20 or 24 in proper position. Thus, with respect to screen 20, which is viewed from the left of Fig. 2, the inverted tape image at the light aperture 6 is reversed by the objective and thrown upon the screen in proper position, and the stretch of tape at the lower aperture 7 presents the characters in the same inverted position in relation to its light beam. This image is reversed three times by the objective 17 and mirrors 21 and 22 and is therefore thrown upon the screen 24 by mirror 23, in proper position for observation from the right of the screen.

The described structure or arrangement including oppositely located upper and lower light apertures, and the means for guiding the tape over the first aperture, down alongside the projector housing and then over the second aperture, without any transverse twist or bend in the tape from the point where it approaches the first aperture to the point where it leaves the second aperture, avoids difficulties or disadvantages of previous duplex projecting arrangements, such for example as an arrangement in which the light apertures are adjacent and parallel and the tape must be transversely twisted and reversed in a direction between the two apertures, with attendant difficulties, such as sticking or binding of the tape on the reversing guide. With the present arrangement, also, the tape is directed in the continuous course in one vertical plane and the pull exerted on it by the tape puller is therefore effective to properly advance the tape without undue strain, jerking or breaking of the tape, etc.

In some cases the tape may be advanced directly from the ticker to the projector without transverse twisting, and in such cases the printed characters will pass over both light apertures with the printed surface upward or outward. Fig. 4 shows a mirror arrangement suitable to such a mode of running the tape, thus, for screen 20 which receives the upper light beam most directly from the projector, there are two mirrors, 60 and 61, arranged at proper angles so that the beam is first received from the objective by mirror 60, and thrown to mirror 61 which reflects the image in proper position on the screen, because of the two reversals of the printed characters provided by the objector and mirror 60, and similarly for screen 24 there are similarly arranged mirrors 62 and 63 which, in conjunction with the mirrors 21 and 22 as previously referred to, throw the beam from the lower light aperture in proper position on screen 24.

The described arrangement of opposite condensers, such as 6 and 7, each corresponding to one of the objectives permits the condenser to be chosen with regard to the focal length of the particular objective so that for example either objective may have any desired length and be positioned at a corresponding distance from its condenser and light aperture, as indicated in Fig. 2, where the upper objective 16 has a relatively short focal length and the lower objective has a greater focal length, corresponding to a greater total distance from the corresponding light aperture of the screen 24, and the condensers 8 and 9 are of different forms corresponding to the stated focal lengths of the objective.

The guide, such as 32, Figs. 1 and 3, engages under and at the edges of the tape as it comes from the ticker and before formation of the transverse twist 40 and is employed whenever necessary to prevent improper lateral movement of the tape at or adjacent the point where it leaves the ticker and is formed into the transverse twist or half-turn 40.

It is obvious that various changes and modifications may be made in the details of construction without departing from the general spirit of the invention set forth in the appended claims.

I claim:—

1. Projecting apparatus comprising a housing having a substantially rectangular portion, condensing lenses in the housing at opposite sides thereof and having a common axis, a lamp and a condensing lens disposed to one side of said common axis and arranged to project a beam intermediate the condensers first mentioned and at a right angle to said axis, and mirrors angularly arranged in relation to each other and to the axis of the beam from the lamp and the last named condenser and each acting to intercept substantially one-half of the beam from the last named condenser and direct it to one of the condensers first mentioned.

2. Projecting apparatus comprising a housing having a substantially rectangular portion, condensing lenses in the housing at opposite sides thereof and having a common axis, a lamp and a plurality of condensing lenses in series disposed to one side of said common axis and arranged to project a beam intermediate the condensers first mentioned and at a right angle to said axis, and mirrors angularly arranged in relation to each other and to the axis of the beam from the lamp and the last named condensers and each acting to intercept substantially one-half of the beam from the last named condensers and direct it to one of the condensers first mentioned.

3. Projecting apparatus comprising a housing having a substantially rectangular portion, condensing lenses in the housing at opposite sides thereof and having a common axis, a lamp and a condensing lens disposed to one side of said common axis and arranged to project a beam intermediate the condensers first mentioned and at a right angle to said axis, and mirrors angularly arranged in relation to each other and to the axis of the beam from the lamp and the last named condenser and each acting to intercept substantially one-half of the beam from the last named condenser and direct it to one of the condensers first mentioned, the housing having opposite light apertures each corresponding to one of the condensers first named.

4. Projecting apparatus comprising a housing having a substantially rectangular portion, condensing lenses in the housing at opposite sides thereof and having a common axis, a lamp and a condensing lens disposed to one side of said common axis and arranged to project a beam intermediate the condensers first mentioned and at a right angle to said axis, mirrors angularly arranged in relation to each other and to the axis of the beam from the lamp and the last named condenser and each acting to intercept substantially one-half of the beam from the last named condenser and direct it to one of the condensers first mentioned, the housing having opposite light apertures each corresponding to one of the condensers first named, and objectives oppositely located and aligned with said common projecting axis.

5. Projecting apparatus comprising a housing having a substantially rectangular portion, condensing lenses in the housing at opposite sides thereof and having a common axis, a lamp and a condensing lens disposed to one side of said common axis and arranged to project a beam intermediate the condensers first mentioned and at a right angle to said axis, mirrors angularly arranged in relation to each other and to the axis of the beam from the lamp and the last named condenser and each acting to intercept substantially one-half of the beam from the last named condenser and direct it to one of the condensers first mentioned, the housing having opposite light apertures each corresponding to one of the condensers first named, and objectives oppositely located and aligned with said common projecting axis screens, and mirrors intermediate the respective objectives and screens and arranged to direct light beams from the first named condensers and objectives to the respective screens.

6. Projecting apparatus comprising a housing, condensing lenses in the housing at opposite sides thereof and having a common axis, a lamp and a condensing lens disposed to one side of said common axis and arranged to project a beam intermediate the condensers first mentioned and at a right angle to said axis, and mirrors angularly arranged in relation to each other and to the axis of the beam from the lamp and the last named condenser and each acting to intercept substantially one-half of the beam from the last named condenser and direct it to one of the condensers first mentioned.

7. In a stock quotation projecting machine having a ticker adapted to mark and discharge tape with reading matter readable longitudinally of the tape, the combination with a pair of independent elongated display screens facing into different inspection areas, of a projecting device removed from said screens, said device including a common source of light, means for splitting the light rays of said source of light into two subordinate beams, said means comprising a pair of mirrors disposed in the path of the light rays from said common source of light and substantially at right angles to one another, an elongated light aperture for each of said mirrors for receiving the subordinate light beams, means for feeding the marked tape across said light apertures, and sets of reflectors so arranged as to direct said last named beams toward and onto said screens respectively so as to produce erect and uninverted images on each screen movable and readable longitudinally of such screen.

8. In a stock quotation projecting machine having a ticker adapted to mark and discharge tape with reading matter readable longitudinally of the tape, the combination with a plurality of independent display screens facing into different inspection areas, of a projecting device removed from said screens, said device including a common source of light, means for splitting the light rays of said source of light into subordinate beams, said means comprising a plurality of mirrors disposed in the path of the light rays from said common source of light and inclined to one another to deflect portions of the main beam of light into different directions, one of such mirrors for each screen, a light aperture for each of said mirrors disposed to intercept the subordinate light beam deflected by its mirror, means for feeding the marked tape successively across said light apertures, and sets of reflectors, one set for each light aperture to intercept the image impressed light beam produced at its light aperture and direct it onto the screen provided for such light aperture.

9. In a stock quotation projecting machine having a ticker adapted to mark and discharge tape, the combination with a pair of independent display screens facing into different inspection areas, of a projecting device removed from said screens, said device including a common source of light, means for splitting the light rays of said source of light into two subordinate beams, said means comprising a pair of mirrors disposed in the path of the light rays from said common source of light and inclined to one another to deflect subordinate beams into different directions, one mirror for each of said screens, a light aperture for each of said mirrors for receiving a subordinate light beam from its mirror, means for feeding the marked tape successively across said light apertures, and sets of reflectors, one set for each of said light apertures to intercept the image impressed light beam produced at its light aperture and direct it onto the screen associated therewith.

AUGUST D. EITZEN.